United States Patent Office 2,694,668
Patented Nov. 16, 1954

2,694,668

LIQUID MULTIPLE VITAMIN PREPARATION AND PROCESS OF PREPARING THE SAME

Howard H. Fricke, Lake Villa, Ill., assignor to Abbott Laboratories, North Chicago, Ill., a corporation of Illinois No Drawing. Application March 10, 1952, Serial No. 275,857

8 Claims. (Cl. 167—81)

The present invention relates to vitamin compositions and more specifically, to a liquid multiple vitamin composition characterized by both physical and chemical stability, and to a novel process of preparing the composition.

Vitamin A, a fat soluble vitamin, and the water soluble vitamins, ascorbic acid known as vitamin C, thiamin used as the hydrochloride salt and known as vitamin $B_1$ are three basic vitamins which have proved to be incompatible in the presence of each other in the presence of air and water. Investigations carried out over relatively long periods of time, for example, have demonstrated that in the presence of air and moisture these vitamins (or decomposition products of the vitamins) speed up or catalyze the decomposition of the other vitamins. As a result of this characteristic, except where the compositions are to be kept for relatively short periods of time, e. g. 1 or 2 months, compositions containing vitamin A, ascorbic acid, and thiamin have, for the most part, been dispensed in moisture-free capsule or tablet form. While the capsules and tablets have proved generally satisfactory, they are objectionable in certain cases as some individuals, and particularly children, encounter difficulty in capsule and tablet administration.

Many attempts have been made by the art to provide stable multiple vitamin compositions in liquid form. These have included aqueous compositions containing black strap molasses, malt syrup and various sugars such as dextrose and sucrose, as well as polyhydroxy compounds such as glycerol, sorbitol, and the like. The compositions containing black strap molasses and malt syrup were found to lose their vitamin potency in a relatively short period of time and to be completely unsatisfactory for use in liquid multiple vitamin compositions. The sugars and polyhydroxy compounds, while an improvement over black strap molasses and malt syrup, also proved on long standing without refrigeration such as encountered in commerce, e. g. storage in warehouses, on shelves in retail stores, etc., to lack the desired stabilizing characteristics. In addition to loss in vitamin potency due to chemical degradation, the prior compositions contaning insoluble materials such as minerals and the like also proved unsatisfactory due to the formation of relatively hard precipitates. The loss in physical stability in the prior compositions was also particularly objectionable where, on standing, the oil containing the oil soluble vitamins separated from the aqueous phase or solution and "gummed up" the neck or sides of the bottle or container. These breakdowns, aside from indicating that the composition was therapeutically "spent" and making uniform dosage impossible, always resulted in substantial vitamin loss. The art has long desired a liquid multiple vitamin composition free from these disadvantages, and specifically a composition characterized by both physical and chemical stability.

The principal object of the present invention is to provide liquid multiple vitamin compositions characterized by both physical and chemical stability.

Another object of the present invention is to provide a stable liquid vitamin composition that may be readily administered per os to all individuals including children.

A further object of the present invention is to provide a novel method of preparing a stable liquid vitamin composition that may be readily administered per os to all individuals including children.

Other objects of the present invention will be apparent as the description proceeds hereinafter.

After a prolonged research investigation in which many materials and various combinations of the same were tried, I discovered a novel method of making a liquid multiple vitamin composition meeting the requirements of the objects stated above. The composition of the present invention consists essentially of a mineral-free, stable liquid oil-in-water emulsion consisting of an aqueous continuous phase and an oil dispersed phase, said continuous phase consisting of a viscous, aqueous starch syrup solution containing a substantial proportion of dextrin and having water-soluble vitamins including ascorbic acid, thiamin and riboflavin dissolved therein, and said dispersed phase consisting of an oil solution having oil-soluble vitamins including vitamin A dissolved therein. Investigations have demonstrated that this composition when prepared according to the method described hereinafter and maintained within the limits set forth below, is both physically and chemically stable when stored at room temperature for prolonged periods, e. g. 1 or 2 years or more.

I have discovered that the composition of the present invention may be produced by performing certain operations in the sequence in which they are set forth hereinafter. An oil such as corn oil in which have been dissolved oil-soluble vitamins such as vitamin A and viosterol is mixed with a portion of a finely divided vegetable gum such as acacia or tragacanth. By "finely divided" is meant granular powder or thin flakes of gum. The resulting mixture is agitated in the presence of an aqueous solution of a wetting agent such as sodium alkyl (lauryl) sulfate (alkali metal higher alkyl sulfates and sulfonates) until a thick, creamy emulsion is formed. A portion of starch syrup is added to the emulsion with agitation to disperse the syrup throughout the emulsion. In addition to the starch syrup, an aqueous starch syrup solution containing some of the water-soluble vitamins may be employed, or alternatively in place of said starch syrup. The resulting emulsion is then homogenized until the overall size of the oil droplets in the emulsion is within the range of 4 to 15 microns and desirably within the range of 4 to 8 microns. The homogenized emulsion is then blended with a viscous, aqueous starch syrup solution containing dissolved therein water-soluble vitamins including vitamin C. The viscous starch syrup solution increases the viscosity of the homogenized emulsion and prevents the oil droplets from coalescing or migrating to the upper strata of the composition. In other words, the oil droplets are immobilized within the composition. The viscosity of the composition may be further increased by the addition of 43° Bé. starch syrup solution. The viscosity of the composition is finally adjusted by the addition of portions of aqueous starch syrup, for example a more viscous starch syrup solution where it is necessary to increase the viscosity of the composition, and a less viscous starch syrup solution where it is necessary to reduce the viscosity of the composition.

The viscosity of the composition is adjusted to provide sufficient fluidity to permit the composition to flow readily from a container to a spoon for administration per os. However, it is essential that the viscosity of the composition be maintained at a level sufficiently high to insure that the overall size of the oil droplets will remain in the range of 4 to 15 microns over an extended period of time, for example, from one to two years or more. Under these conditions, I have found that the oil droplets do not tend to migrate to the upper strata of the composition or to coalesce at the surface of the composition. When prepared as described, no ring of oil is found at the top or on the walls of the container even after several years standing. With the composition of the present invention, the patient receives the full range of vitamins at the appropriate concentrations from each and every portion of the contents of the container.

Viscosity measurements on test portions of the composition may be made using any suitable apparatus, for example a Hoeppler precision viscosimeter. Using this viscosimeter, the viscosity of a specimen of the composition of the present invention was found to be 2000 poises at 77° F. and 3400 poises at 68° F. Batches of the composition having this viscosity were found to be physically stable for periods of two years and longer.

The composition of the present invention may be found enhanced in elegance by dissolving in the aqueous phase sufficient cane sugar to increase the specific gravity in the aqueous phase to the point at which the index of refraction of the aqueous phase matches the index of refraction of the oil phase. The composition thereupon becomes quite clear and substantially free from the turbidity or haze which would otherwise result from the difference in refraction indices of the oil phase and the aqueous phase. The cane sugar thus added also renders the composition sweet in taste and therefore more palatable. In place of cane sugar for the purpose of eliminating haze in the composition, fructose or other sugars may be employed for this purpose, in which event other sweetening agents such as cyclohexylcarbamate may also be added. Flavoring agents may also be added to enhance the taste of the composition. Preservatives such as benzoic acid and methyl parahydroxybenzoate may also be added to the aqueous phase to inhibit mold growth and deterioration of the composition.

Inasmuch as riboflavin has a limited solubility in water, I have found it expedient to heat water to boiling and to thereafter dissolve the riboflavin and nicotinamide in the hot water. This solution when admixed with starch syrup and cooled is then blended with the emulsion. The aqueous starch syrup solution may be divided in two portions, one of which may be employed in making the oil-in-water emulsion and the remainder may be admixed with the aqueous solution of the less stable water-soluble vitamins and other ingredients and thereafter blended with the homogenized emulsion. Other water-soluble vitamins such as thiamin may be dissolved in this solution. Vitamin C (ascorbic acid) is unstable in hot water and hence I have found it expedient to dissolve the vitamin C in water at room temperature and to add the resulting solution to the starch syrup solution with which the homogenized oil is to be blended. The preservatives may be added either to the hot solution along with the riboflavin and nicotinamide or to the starch syrup solution containing the thiamin and vitamin C. In order to avoid substantial occlusion of air and thereby prevent oxidation of vitamin A and vitamin C during agitation, mixing, emulsifying, and blending operations, I have found it desirable to conduct these operations under an atmosphere of $CO_2$. I have found further it is desirable to charge the oil with $CO_2$ gas prior to the addition of the oil-soluble vitamins and to continue to bubble $CO_2$ gas into the oil solution during the mixing operation.

In place of vegetable oils such as corn oil and sesame oil for the oil phase of the composition of this invention, other suitable oils may be employed, for example fish oils and vitamin-containing fish oils. Fish oils impart an undesirable fishy taste and are less desirable than vegetable oils.

Various wetting agents may be employed in place of sodium alkyl (lauryl) sulfate, for example polyalkylene sorbitan mono-oleate and polyalkylene stearate, as well as numerous others that are suitable for human ingestion. In some instances, the vegetable gum may be omitted and the dispersing agent may be confined to wetting agents such as those described hereinabove. The desired procedure, however, is to employ both the vegetable gum and the wetting agent.

While it is conceivable that the blend of oil-in-water emulsion and the balance of the starch syrup solution may be prepared and adjusted to the necessary viscosity prior to homogenizing the composition, this procedure is not as satisfactory as that described hereinabove in which the emulsion is blended with a portion of the starch syrup solution, homogenized and thereafter blended with the larger portion of the starch syrup solution. The latter procedure gives rise to better stability and less likelihood of coalescence of oil droplets. Moreover, the procedure eliminates the processing of larger volumes of composition through homogenizing equipment of conventional proportions.

The protective agent or composition which keeps the vitamins from decomposing and from attacking each other and which provides for both physical as well as the essential chemical stability in a starch syrup containing a substantial proportion of dextrin and prepared by the hydrolysis of starch, and preferably corn starch syrup containing a substantial proportion of dextrin prepared by the hydrolysis of corn starch. Corn, potato, rice, tapioca, wheat, etc., starches are carbohydrates with the chemical formula $(C_6H_{10}O_5)_x$, and are believed to be high polymers of the group within the parentheses. They hydrolyze in dilute acid in staircase fashion through a succession of complex compounds including the dextrins which are written with the same empirical formula as starch but differ in that they consist of shorter chains or smaller aggregates. Further hydrolysis yields the sugar maltose, and with still further hydrolysis the sugar dextrose, sometimes called glucose. By varying the conditions of hydrolysis of the starch and stopping the hydrolysis at a desired point, it is possible to secure dextrin containing syrups of varying degrees of depolymerization.

During my investigations I discovered that the starch syrups suitable for use in the present invention should contain about 20 to 60 per cent dextrin and preferably about 35 to 50 per cent dextrin. One of the preferred commercial corn syrups described in the examples has a viscosity of 43° Bé. and a viscosity in poises at 100° F. of 150 poises. One of the preferred compositions described in the examples contains corn starch syrup with 46 per cent dextrin. I have also discovered that the compositions of the present invention should contain about 30 to 70 per cent starch syrup solids and preferably about 50 to 65 per cent solids. One of the preferred compositions described in the examples contains about 60 per cent starch syrups solids.

Investigations have demonstrated that the starch syrups suitable for use in the present invention are complex hydrolyzates made up of dextrins, maltose, dextrose, and other compounds or complexes, i. e. degraded starch molecules, of unknown structure. Investigations have also demonstrated that the dextrins themselves are not the critical chemical stabilizing factor as "synthetic" starch syrup compositions made up by mixing dextrins with sugars such as maltose and dextrose have been found to lack the desired chemical stabilizing characteristics. Just what factor or factors in the starch hydrolyzate chemically stabilize the compositions of the present invention is not known. Investigations, however, show that the starch syrup is in the proper condition for chemically stabilizing the compositions of the present invention when the syrup contains the percentage of dextrins set forth above. Thus the measure of the dextrins in the starch syrup is merely a convenient means for determining when the hydrolyzate will perform the required chemical stabilization of the compositions of the present invention.

The invention may be illustrated by the following examples:

EXAMPLE I

| | |
|---|---:|
| Vitamin A distillate, 200,000 u./gm_____gm__ | 12.6 |
| Viosterol concentrate in sesame oil, 1,000,000 u./gm_____gm__ | 0.672 |
| Thiamin hydrochloride_____gm__ | 0.8 |
| Nicotinamide _____gm__ | 4.0 |
| Riboflavin _____gm__ | 0.96 |
| Ascorbic acid_____gm__ | 48.0 |
| Corn starch syrup (80 per cent solids, 46 per cent dextrin) _____cc__ | 3,000 |
| Acacia _____gm__ | 3.32 |
| Oil of orange, terpeneless _____cc__ | 1.2 |
| Alcohol _____cc__ | 20 |
| Benzoic acid_____gm__ | 4.0 |
| Sodium alkyl (lauryl) sulfate (alkali metal higher alkyl sulphates and sulfonates_____gm__ | 0.21 |
| Methyl parahydroxy benzoate_____gm__ | 1.2 |
| Cane sugar_____gm__ | 600 |
| Distilled water, approx._____cc__ | 800 |

Place the riboflavin, nicotinamide, benzoic acid, and methyl parahydroxy benzoate in 535 cc. of water and heat with stirring until they are completely dissolved. Add approximately 1,000 cc. of the corn starch syrup with stirring. Withdraw 200 cc. of this solution and reserve— to be used in making the primary emulsion. Add the remainder of the corn starch syrup to the mixture and stir under $CO_2$ atmosphere until a uniform mixture is obtained. Mix the oil of orange and the alcohol and add to this mixture. Dissolve the ascorbic acid and thiamin hydrochloride in 250 cc. distilled water and add to the above mixture with stirring under $CO_2$ atmosphere.

Thoroughly mix the vitamin A distillate, viosterol in oil, and acacia with a lightning mixer. To this suspension add the sodium alkyl (lauryl) sulfate which has previously been dissolved in sufficient water to equal one-half the volume of oils used and stir with a lightning mixer until a smooth uniform emulsion is formed. Slowly dilute this emulsion with the 200 cc. of solution reserved for this purpose. Homogenize this mixture until the oil globules are four to eight microns in size.

Homogenize this diluted primary emulsion into the corn starch syrup solution of water-soluble vitamins while stirring under $CO_2$ atmosphere. Add the cane sugar and stir under $CO_2$ atmosphere until it is completely dissolved. Finally adjust the solution to the desired viscosity and make up to volume by adding the proper amounts of corn starch syrup and water.

This forms a bright yellow liquid which is physically and chemically stable. It is a pharmaceutical preparation which, in contrast to previously known preparations, is clear and transparent, does not break or separate even after prolonged storage, and in which both the water-soluble and the oil-soluble therapeutic ingredients are protected against decomposition for prolonged periods of time. It has attractive appearance and a pleasing taste, thus constituting what is referred to in the trade as an "elegant" preparation.

In addition to the water-soluble vitamins in the above composition, other water-soluble vitamins, particularly vitamin $B_{12}$, may be incorporated. It is desirable to dissolve the vitamin $B_{12}$ in a small portion of water and add the resulting solution to the aqueous corn syrup solution containing the ascorbic acid.

EXAMPLE II

| | |
|---|---|
| Vitamin A distillate, 200,000 u./gm_____gm__ | 12.6 |
| Vitamin D about 672,000 units in a sesame oil concentrate having a strength of 100,000 u./gm_____gm__ | 0.672 |
| Vitamin E in 10,000 units in 20 gm. of sesame oil; vitamin K, 1.5 gm. dissolved in same oil with vitamin E—total weight of both_____gm__ | 21.5 |
| Thiamin hydrochloride_____gm__ | 0.80 |
| Suspension adjuvant, gum acacia_____gm__ | 10. |
| Emulsifying agent, alkali metal, higher alkyl sulfates and sulfonates, such as sodium alkyl (lauryl) sulfate_____gm__ | .063 |
| Nicotinamide_____gm__ | 4.0 |
| Riboflavin _____gm__ | 0.96 |
| Preservative—benzoic acid_____gm__ | 4.0 |
| Preservative, methyl parahydroxy benzoate__gm__ | 1.2 |
| Wheat starch syrup, analyzing 40% dextrin, about 80% total solids, about_____cc__ | 3000 |
| Flavoring, terpeneless oil of orange_____cc__ | 1.2 |
| Flavoring solvent—ethyl alcohol_____cc__ | 20. |
| Ascorbic acid_____gm__ | 48 |
| Cane sugar_____gm__ | 600 |
| Distilled water, about_____cc__ | 800 |

*The aqueous medium*

Place the riboflavin, nicotinamide, benzoic acid and methyl parahydroxy benzoate in 535 cc. of water and heat with stirring until they are completely dissolved. These ingredients will not be injured by heating to 100° C. but solution is usually complete before that temperature is reached. Add about 1,000 cc. of the wheat starch syrup with continued stirring. Withdraw about 200 cc. of this solution and reserve it for use in the emulsification. Add the remainder of the starch syrup to the mixture and stir under $CO_2$ atmosphere until a uniform mixture is obtained. Mix the flavoring ingredients into the alcohol and add to the main mass. Dissolve the ascorbic acid and the thiamin hydrochloride in 250 cc. of distilled water and add to the main mass with stirring under $CO_2$ atmosphere.

*The oily medium*

Mix the vitamin A distillate and the vitamin D in sesame oil and the sesame oil containing vitamins E and K thoroughly with a power agitator, together with the gum acacia. Dissolve the emulsifying agent (Duponol, PC) in 20 cc. of water and add this solution to the oil mixture with constant agitation in order to obtain a primary emulsion. This mixture is agitated with a power stirrer until a smooth, uniform emulsion is formed. With continued agitation the 200 cc. of partially completed aqueous solution reserved for the purpose is added slowly. After addition is complete the mixture is homogenized until the globules of oil are from 4 to 8 microns in size.

The primary emulsion is now sufficiently dilute so that it can be successfully homogenized into the main mass of wheat starch syrup solution containing all of the water soluble vitamins, and this is done while stirring under $CO_2$ atmosphere. Then the cane sugar is added and stirring continued under $CO_2$ atmosphere until the sugar is completely dissolved.

It will be obvious that various of the vitamin ingredients of the foregoing example may be omitted, if desired, or the relative amounts of the different vitamins may be varied up to 2 or 3 times the amounts given in the example. The amounts recited in the example are a desirable selection from the point of view of the physician and optimum nutritional requirements. It will also be obvious that the flavoring composition used in the examples may be omitted or replaced with other flavors. It will also be obvious that other preservatives (used to prevent molding or bacterial decomposition) may be employed.

In place of the starch syrups used in the above examples it will be apparent to those skilled in the art that other syrups such as potato, rice, and cassava starch hydrolysates may be employed as well as mixtures or various combinations thereof. The pH of the composition should be maintained between 2 and 5, with a pH of 3-4 being preferred. In the examples the ascorbic acid provides the compositions with a pH of around 3. The cane sugar may be omitted or replaced with other sugars such as dextrose, maltose, etc., if desired. However, the use of substantial proportions of cane sugar (sucrose) is preferred as it improves the taste and physical appearance of the composition.

This application is a continuation-in-part of my copending applications, Serial Nos. 592,263, filed May 5, 1945, now abandoned; 690,695, filed August 14, 1946, now abandoned; and 114,061, filed September 3, 1949, now abandoned.

I claim:

1. The process of preparing a chemically and physically stable liquid multiple vitamin composition consisting essentially of a stable liquid oil-in-water emulsion having an aqueous continuous phase and an oil dispersed phase, said continuous phase comprising a viscous, aqueous corn syrup solution having water soluble vitamins dissolved therein including thiamin and ascorbic acid, and said dispersed phase comprising an oil solution having oil soluble vitamins dissolved therein including vitamin A, which comprises the steps of forming a primary oil-in-water emulsion by mixing said oil solution with a dispersing agent and water until a thick, creamy emulsion is formed, blending the resulting emulsion with said corn syrup and homogenizing said blended emulsion until the overall particle size of the oil droplets is within the range of 4–15 microns.

2. The process of claim 1 with the additional step of dissolving in the continuous phase a quantity of sucrose sufficient to elevate the specific gravity of the continuous phase to a point at which the composition becomes substantially haze free.

3. The product of the process of claim 1.

4. The product of the process of claim 2.

5. The process of preparing a chemically and physically stable liquid multiple vitamin composition consisting essentially of a stable liquid oil-in-water emulsion having an aqueous continuous phase and an oil dispersed phase, said continuous phase comprising a viscous, aqueous corn syrup solution having water soluble vitamins dissolved therein including thiamin and ascorbic acid, and said dispersed phase comprising an oil solution having oil soluble vitamins dissolved therein, including vitamin A, which comprises the steps of forming a primary oil-in-water emulsion by mixing said oil solution with a dispersing agent and water until a thick, creamy emulsion is formed, blending the resulting emulsion with corn syrup, homogenizing said blended emulsion until the overall particle size of the oil droplets is within the range of 4–15 microns, and blending said emulsion with additional corn syrup having said water soluble vitamins dissolved therein with mixing to uniformly distribute said oil droplets in said continuous phase.

6. The product of the process of claim 5.

7. The process of preparing a chemically and physically stable liquid multiple vitamin composition consisting essentially of a stable liquid oil-in-water emulsion having an aqueous continuous phase and an oil dispersed phase, said continuous phase comprising a viscous, aqueous corn syrup solution having water soluble vitamins dissolved therein including thiamin and ascorbic acid and said dispersed phase comprising an oil solution having oil soluble vitamins dissolved therein, including vitamin A, comprising the steps of forming a primary oil-in-water emulsion by mixing said oil solution with a vegetable gum and an aqueous solution of a wetting agent until a thick, creamy emulsion is formed, blending the resulting primary emulsion with corn syrup, homogenizing said blended emulsion until the overall particle size of the oil droplets is within the range of 4–15 microns, and diluting said homogenized emulsion with a large amount of said viscous, aqueous corn syrup containing water soluble vitamins with mixing to uniformly distribute said oil droplets in said continuous phase.

8. The product of the process of claim 7.

References Cited in the file of this patent

UNITED STATES PATENTS

| Number | Name | Date |
|---|---|---|
| 2,022,464 | Hall | Nov. 26, 1935 |
| 2,167,144 | Barton | July 25, 1939 |
| 2,359,413 | Freedman | Oct. 3, 1944 |
| 2,407,624 | Bird | Sept. 17, 1946 |
| 2,410,417 | Andersen | Nov. 5, 1946 |
| 2,417,299 | Freedman | Mar. 11, 1947 |

FOREIGN PATENTS

| Number | Country | Date |
|---|---|---|
| 539,397 | Great Britain | Sept. 9, 1941 |
| 500,770 | Great Britain | Feb. 15, 1939 |
| 493,925 | Great Britain | Dec. 31, 1936 |

OTHER REFERENCES

Atlas Spans and Atlas Tweens, November 1942, pages 1, 2, 7, 8.

U. S. Dispensatory, 23rd ed. (1943), pages 490, 491.

Kerr: Chemistry and Industry of Starch (1944), page 285.

Gutman: Modern Drug Encyclopedia, 2d ed. (1941), page 697.